United States Patent [19]
Harris et al.

[11] Patent Number: 5,926,592
[45] Date of Patent: Jul. 20, 1999

[54] OPTICAL FIBRE CONFOCAL IMAGER WITH VARIABLE NEAR-CONFOCAL CONTROL

[75] Inventors: Martin Russell Harris; Peter Delaney, both of Notting Hill Vic, Australia

[73] Assignee: Optiscan Pty Ltd, Toorak, Australia

[21] Appl. No.: 08/913,737

[22] PCT Filed: Mar. 22, 1996

[86] PCT No.: PCT/AU96/00159

§ 371 Date: Sep. 23, 1997

§ 102(e) Date: Sep. 23, 1997

[87] PCT Pub. No.: WO96/30796

PCT Pub. Date: Oct. 3, 1996

[30] Foreign Application Priority Data

Mar. 24, 1995 [AU] Australia .................................. PN1940
Dec. 20, 1995 [AU] Australia .................................. PN7225

[51] Int. Cl.⁶ ........................................................ G02B 6/26
[52] U.S. Cl. ................................. 385/33; 385/127; 385/36; 385/38; 385/35; 385/48
[58] Field of Search ................................. 385/24, 12, 33, 385/116, 119, 34, 35, 902; 250/227.14, 227.15, 227.16, 227.2, 227.26, 227.29

[56] References Cited

U.S. PATENT DOCUMENTS

| | | | |
|---|---|---|---|
| 4,427,977 | 1/1984 | Carollo et al. | 385/910 |
| 4,978,190 | 12/1990 | Veith | 350/96.1 |
| 5,270,537 | 12/1993 | Jacobs | 250/227.15 |
| 5,579,426 | 11/1996 | Li et al. | 385/24 |

FOREIGN PATENT DOCUMENTS

| | | |
|---|---|---|
| WO 9000754 | 1/1990 | WIPO . |
| WO 9001716 | 2/1990 | WIPO . |
| WO 9410595 | 5/1994 | WIPO . |

*Primary Examiner*—Hung N. Ngo
*Attorney, Agent, or Firm*—Biebel & French

[57] ABSTRACT

A confocal imaging system using optical fibers is provided which has a flexible near confocal optical transmission means having a light collection end adjacent to a light collection of the confocal optical transmission means and adapted to transmit only near confocal light emerging from points in the object located within a range of distances above and below the focal plane, in such a manner that a selected portion of the near confocal light emerging from greater than any selected distance within the range is substantially separable from the remainder. The system also has variable selection means to exclude from detection the selected portion.

32 Claims, 18 Drawing Sheets

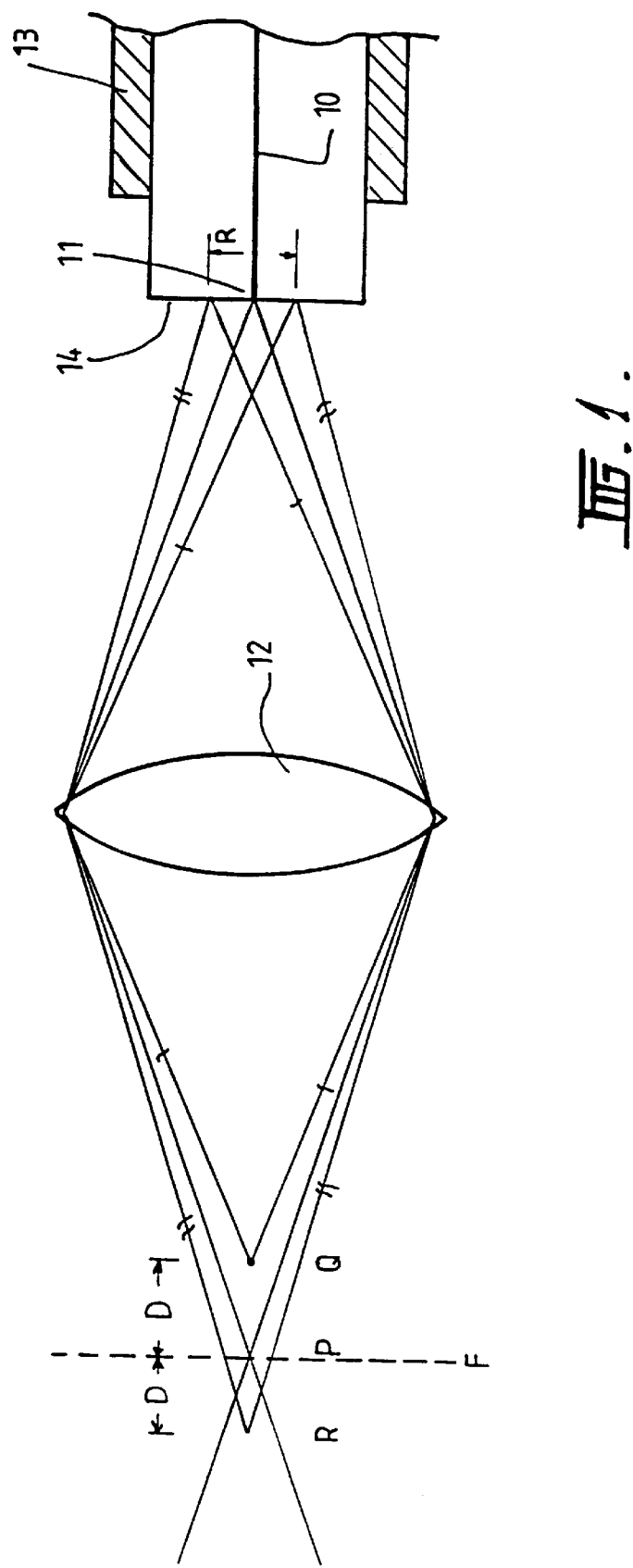

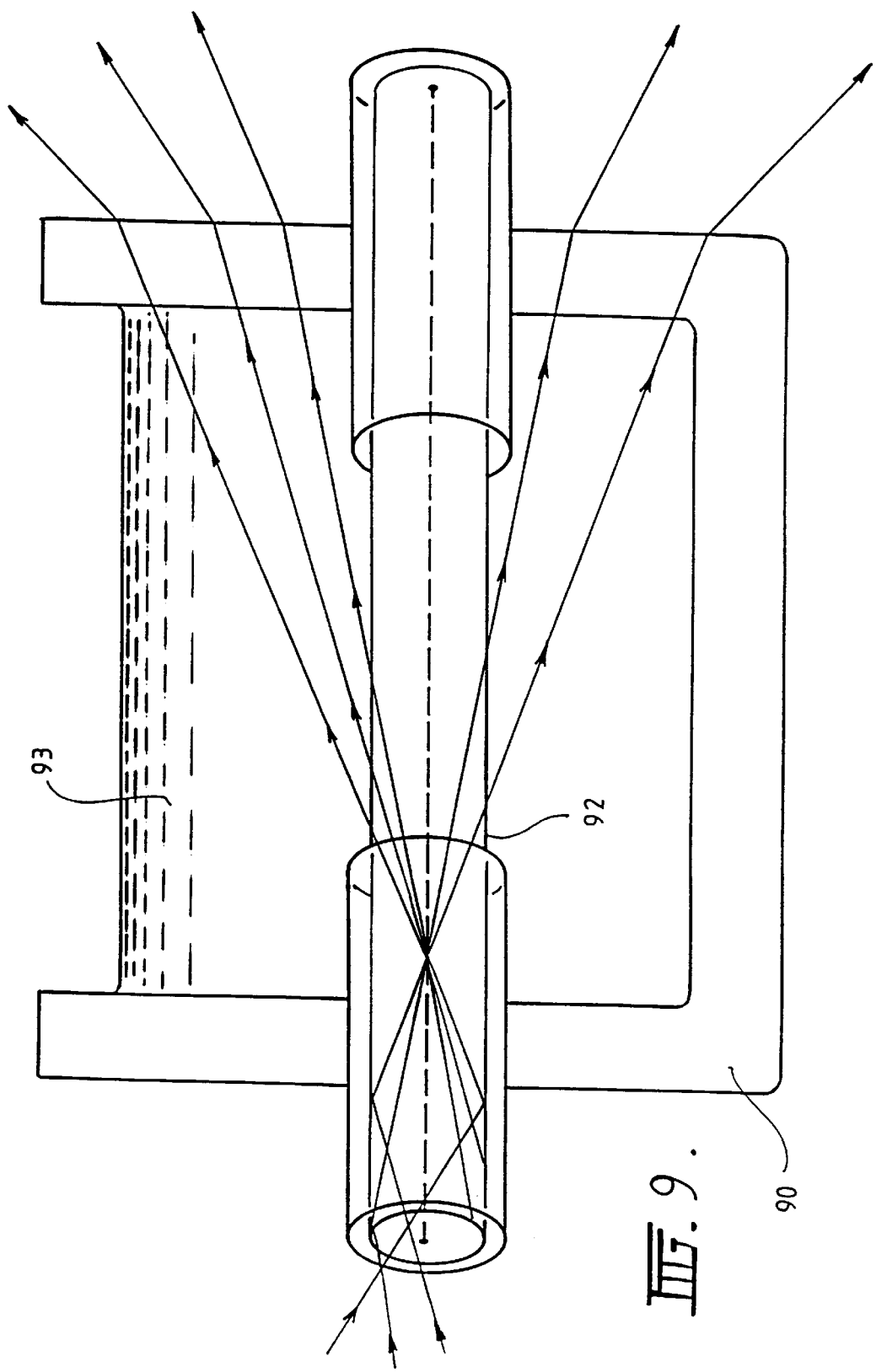

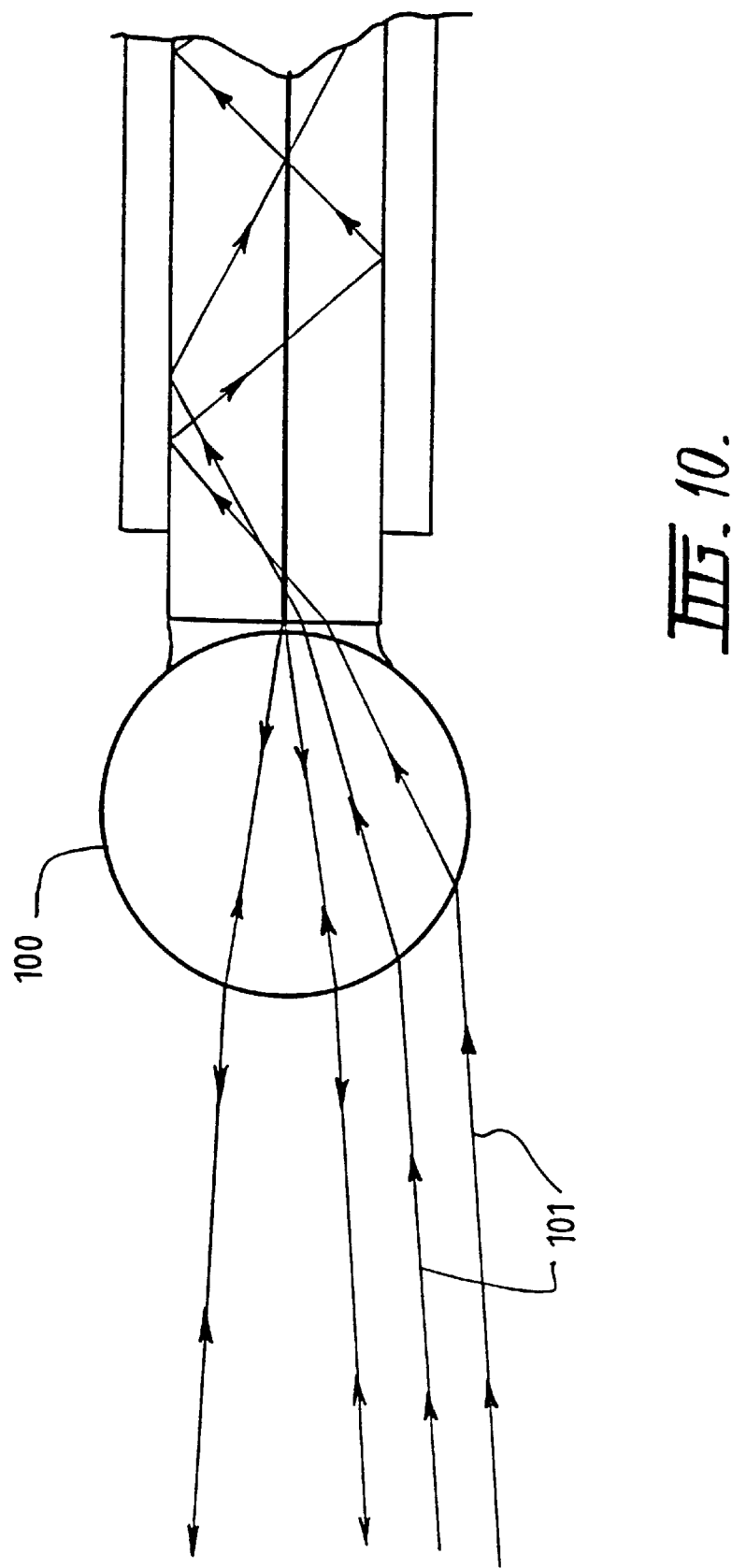

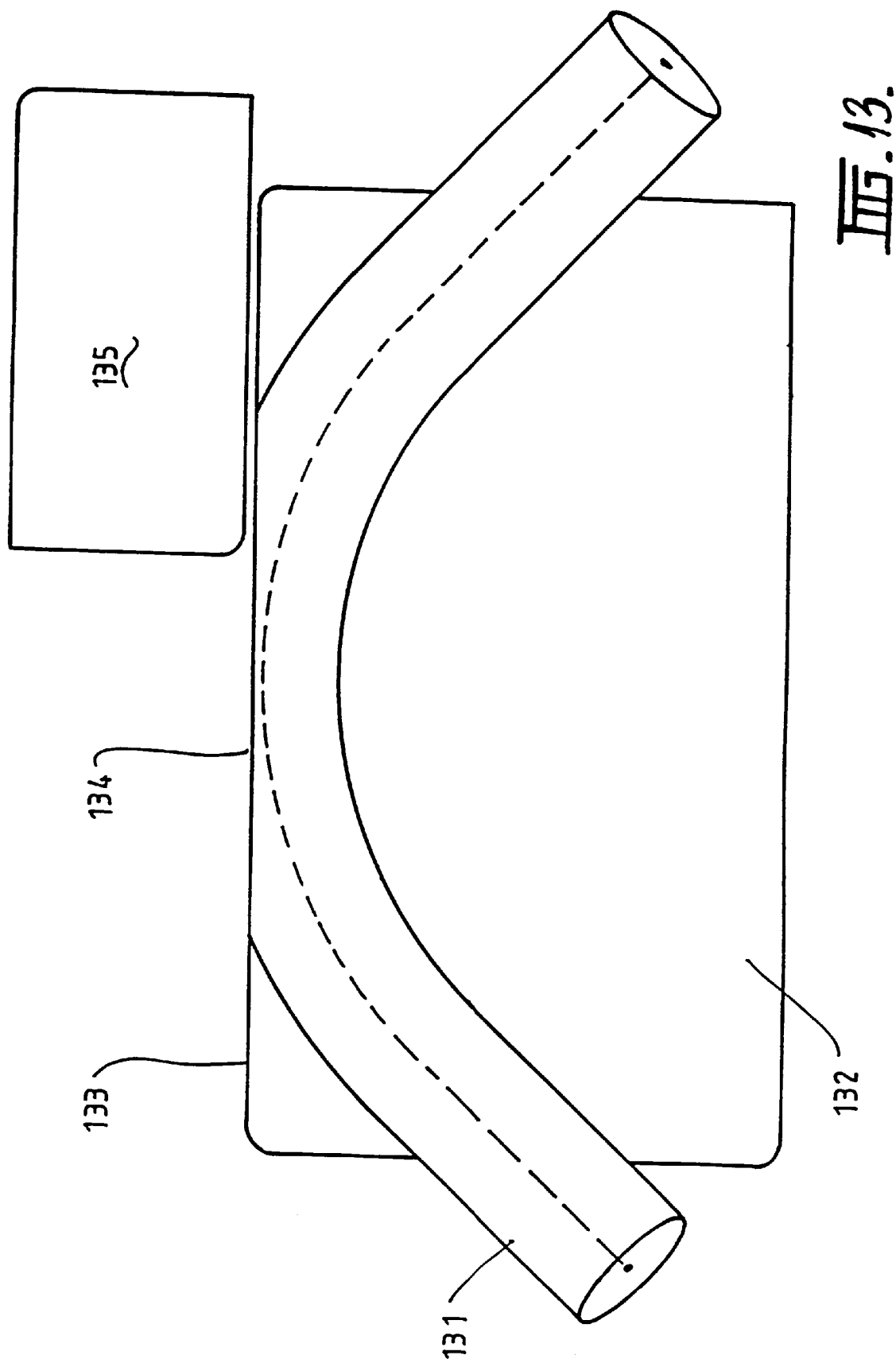

OPTICAL FIBRE CONFOCAL IMAGER WITH VARIABLE NEAR-CONFOCAL CONTROL

FIELD OF THE INVENTION

This invention relates to confocal imaging systems which use a flexible optical transmission means such as optical fibres as a substitute for the return pinhole, and more particularly but not limited to confocal microscopes constructed using optical fibres.

DESCRIPTION OF THE PRIOR ART

Confocal microscopy can be considered to have originated with the work of Marvin Minsky. His U.S. Pat. No. 3,013,467 describes a system in which light passes through a pinhole, traverses a beamsplitter and is focused by an objective to a spot on or within a specimen. In an epi-illumination embodiment, light returning from the spot region is converged by the same objective lens, reflected by its second encounter with the beamsplitter and passes through a second pinhole to a photo detector. The geometry of the arrangement is such that the focused spot (Gaussian waist volume) is the only volume within the specimen from which the general set of ray paths returning through the lens will retrace their outgoing paths to pass through the second pinhole to the photo detector. Light reflected from above or below this focus which passes through the objective lens will be largely blocked off by the opaque sheet material forming the pinhole surrounding area.

The electrical signal from the photo detector will give a value for the light reflected from the spot. If the specimen is moved the changes in electrical output from the photo detector indicate changes in the level of light return from the material of the specimen along the path of the spot. If the specimen is moved in a two dimensional raster then a two dimensional rastered map of the return light intensity can be build up based on the raster synchronous modulation of the electrical output from the photo detector. This can be displayed on a cathode ray screen or by other means giving an image which is a sharp optical slice, substantially eliminating the contribution of light from above or below the focal plane. Such light normally reduces the contrast and blurs the image in conventional microscopy, particularly from translucent biological specimens, and renders high power microscopic observation of thick tissue sections impossible. The use of an optical fibre in the place of one or more of the pinholes is disclosed in U.S. Pat. No. 5,120,953. In such a fibre confocal microscope, the core of the optic fibre effectively acts as the pinhole, and, when the fibre is single moded, the light leaves the fibre as a single set of concentric expanding wavefronts and the system becomes diffraction limited and maximum resolution is obtained.

The chief advantage of using a fibre to replace the pinhole is that the two sides of the pinhole are effective optically connected by the core of the fibre, but are physically independent and can be independently and separately positioned. The major advantages conferred by this are (a) the several large and heavy components of the microscope can be located in any convenient position and do not need to be rigidly located with respect to the specimen;

(b) the fibre tip itself can be mechanically scanned to give the raster required to build-up the image data set;

(c) an "in fibre" evanescent wave beamsplitter can be employed.

A disadvantage of existing fibre confocal microscopes is that for these systems there is no direct functional equivalent of opening up the pinhole. Most bulk optic laser scanning confocal microscopes include a function in which the second pinhole can be progressively enlarged. While for the purposes of the highest resolution image, the smallest sized second pinhole is desirable consistent with a reasonable optical signal strength, in practice it is desirable to enlarge and contract the second pinhole as the microscopist examines the object, by the means of operating a continuously variable diaphragm. The diaphragm opens the aperture and collects an increasing fraction of light from the double cone volume on either side of the Gaussian waist region. This increases the strength of the electrical signal but at the expense of optical resolution. This procedure is used (a) during a "search mode" in the early stages of observation where quick single scan images are being used to locate the desired structure;

(b) where a rapidly moving structure is to observed which is not repetitive and thus cannot be scan synchronised;

(c) where an increased depth of field is desired for large depth three dimensional reconstructions;

(d) where the fluorescence or the reflection signal is very weak;

(e) where the fluorophore is fugitive (ie. easily photobleached or spontaneously decomposing).

SUMMARY OF THE INVENTION

It is an object of the current invention to be able to construct a fibre optic confocal imaging system which retains the advantages of the use of the optical fibre but in addition has an equivalent function of opening up and closing down a pinhole without the necessity of providing a physical pinhole or diaphragm adjacent to the specimen optics.

Therefore in accordance with a broad aspect of the invention there is provided a confocal imaging system comprising:

a light source for supply of a light beam;

light focusing means for focusing light from the beam onto a point observational field on or within an object and for receiving object emanated light emanating from the vicinity of the point observational field;

a detector for detecting the object emanated light;

scanning means operable to cause relative movement between the object and the point observational field such that the point observational field scans over a focal plane transverse to an optical axis of the imaging system; and flexible optical transmission means for transmitting the source light beam from the light source to the light focusing means and for transmitting the object emanated light to the detector, and having light separator means to separate the object emanated light from the light beam for passing to the detector and confocal optical transmission means to transmit the object emanated light emerging only from the point observational field;

wherein the optical transmission means further comprises (i) flexible near confocal optical transmission means having a light collection end adjacent to a light collection end of the confocal optical transmission means and adapted to transmit only near confocal light emerging from points in the object located within a range of distances above and below the focal plane in such a manner that a selected portion of the near confocal light emerging from greater than a corresponding selected distance within said range is substantially separable from the remainder; and (ii) an exit region for exit of at least a portion of said near confocal light from the flexible near confocal optical transmission means;

and wherein there is further provided variable selection means to define said selected portion and exclude it from the detector.

By providing separable transmission through flexible and selectable means, a variable pinhole effect can be provided which may be located remotely of the specimen.

In one class of embodiment, the near confocal optical transmission means comprises a plurality of optically isolated channels having adjacent ends at said light collection end to provide said substantially separable transmission. The plurality of channels may be provided by a bundle of optical fibres, or a large diameter optical fibre with multiple cores. Alternatively, the plurality of channels may be a plurality of coaxial concentric waveguides, mutually separated by optically insulating material.

In this first class of embodiments, an exit region of the near confocal optical transmission means may be provided by a plurality of etched sections of fibre exposing different ones or subsets of said plurality of channels and containing optical cement to divert light travelling in the corresponding one or subset of channels to corresponding photo detectors. In this case, the variable selection means comprises switching circuitry or the like to select output from different photo detectors. Alternatively, the exit region may be provided by opposite ends of the plurality of isolated channels forming an emission end of the fibre or fibre bundle, and the variable selection means may comprise focusing means to project an image of the emission end onto a region containing a variable diaphragm to progressively exclude from detection said selected portion, the detector being disposed behind the diaphragm.

In a second class of embodiments, the near confocal optical transmission means comprises a wide diameter fibre or the cladding of a single mode optical fibre. In this class of embodiments, the substantial separability of said selected portions may be attained if the focussing means causes rays entering the light collection end of optical fibre to be transmitted through the fibre at an angle which increases with the distance of a point of entry of the ray into the collection end from the optical axis of the fibre. The variable selection means may include a variable diaphragm disposed adjacent the exit region of the optical fibre to exclude light emerging at greater than a selected angle.

In embodiments where the exit region is provided by an emission end of the fibre or fibre bundle, the variable selection means may also include near confocal focussing means to focus an image of the emission end of the fibre onto a second variable diaphragm.

In other embodiments of the second class the exit region is provided by an exposed side of the fibre such as an area of the fibre stripped of its outer jacket and contacting a material with refractive index suitably matched to the fibre so as to extract the near confocal light. The near confocal light may be extracted from a single such region and the variable selection performed by variable diaphragm means. Alternatively, the near confocal light may be extracted from a plurality of regions along the length of the fibre contacting materials having progressively greater refractive index to progressively extract rays of lower angle, the variable selection means comprising optical or electronic switching means.

In a third class of embodiments, the near confocal optical transmission means comprises a gradient index fibre. In this class, the exit region may be provided by successively deepening etched areas in the fibre side with corresponding photo detectors. Alternatively, the exit region may be provided by an emission end of the fibre. In such cases, a first variable diaphragm may be provided to admit only low angle light through near confocal focussing means to project an image of the fibre tip onto a second variable diaphragm in front of the detector.

DESCRIPTION OF THE PREFERRED EMBODIMENTS

In order that the invention may be more clearly ascertained, preferred embodiments will now be described with reference to the accompanying drawings, in which FIG. 1 is a diagram of ray paths emerging from the vicinity of the point observational field of a confocal microscope and being focused onto the collection end of an optical transmission means;

FIG. 9 shows another variation of the embodiment of FIG. 8;

FIG. 10 shows detail of another embodiment of the second class using a ball lens to angularly code the light before it enters the collection end of the fibre;

FIG. 13 shows a further embodiment in which a variable amount of the higher order modes can be extracted by the selective positioning of a polymer block in contact with a polished portion of the optical fibre.

Figure 2A:
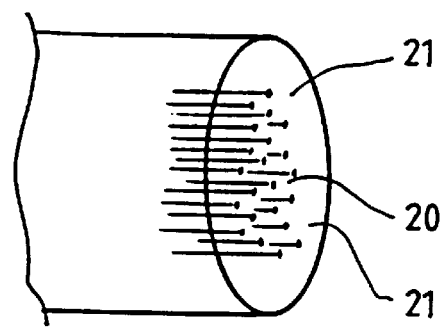
FIGS. 2a, 2b, 2c and 2d are examples of the plurality of isolated channels of the first embodiment of the invention.
Figure 2B:
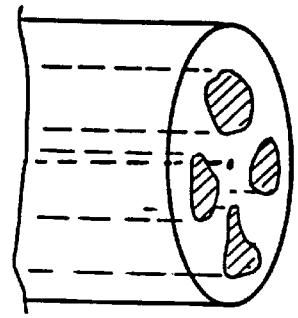
Figure 2C:
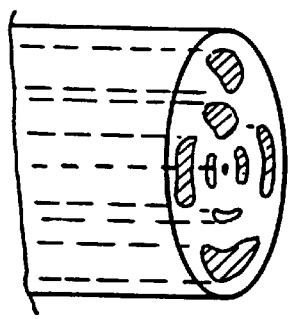

Referring now to FIG. 1, there is shown a schematic diagram of ray paths from points in an object above and below the focal plane. Specifically, a single mode optical fibre in a fibre confocal microscope typically may use the core 10 of a single mode optical fibre to transmit laser source light from a laser (not shown). At an end 11 of the core 10 of the optical fibre, the laser light projects outward in a cone of divergence angle approximately 8 to 10° for a typical fibre (exaggerated in the figure) through a focusing lens 12, focusing the light to a point observational field P within an object to be observed (object not shown). Since the light returning through the focusing lens 12 and back into the end 11 of the core of single mode fibre must pass through the point P, it is predominantly light emanating from point P which re-enters the core, providing the desired isolation of the light from the focal plane F and enabling this "confocal" light to be collected by the use of separations means such as a beamsplitter or optical fibre coupler. Light from points Q and R in the vicinity of P but a distance D above and below respectively the focal plane F is not focused into the end of the core 11, but has a focal point either immediately in front of or behind the end of the core 11. As a result, at the front face 14 of the optical fibre, light from points Q and R diffusively impinges on the cladding material of the fibre. Normally the cladding of a single mode fibre is surrounded by a jacket 13 having a refractive index greater than that of the cladding and therefore inhibiting the propagation of rays called cladding modes through the cladding, called cladding modes.

Clearly, light emanating from points closer than a distance D falls within a circle of radius R at the face 14 of the optical fibre, and as D is increased, so does R increase. Accordingly, the distance R from the axis at which light impinges on the optical fibre is related to a distance D from the focal plane from within which the light has emanated.

This well-known aperture relationship is what allows the opening and closing of the pinhole in a standard confocal microscope to provide increased depth of field.

Accordingly, if the light can be transmitted in such a way that this distance relationship is preserved or otherwise encoded, then the light is transmitted in a separable manner such that when it reaches an exit region of the fibre, it may by various means be selected in a progressive manner to define the equivalent of a variable pinhole.

In the first class of preferred embodiments, which are the simplest to visualise, this distance relationship is preserved by providing a plurality of isolated channels, as shown in FIG. 2. For example, as shown in FIG. 2a this may be realised by a coherent fibre bundle, with the laser light delivery and confocal return fibre 20 at its centre, and a plurality of collection fibres surrounding the delivery core. Alternatively, a multi-core fibre may be used such as the "four leaf clover" design shown in FIG. 2b, or a multiple clover design shown in FIG. 2c. An alternative variation involves concentric cylindrical wave guide regions as shown cut-away in FIG. 2d, separated by lower refractive index regions 23 (for example, silica glass) which space the higher refractive index cylinders by a distance sufficient to reduce coupling between the cylinders to an acceptable level over the lengths used in the fibre optic patch cords. A jacket 24 encompasses the fibre. It may be desirable for the outer cylindrical wave guide structures to be thicker than inner ones.

Figure 3:
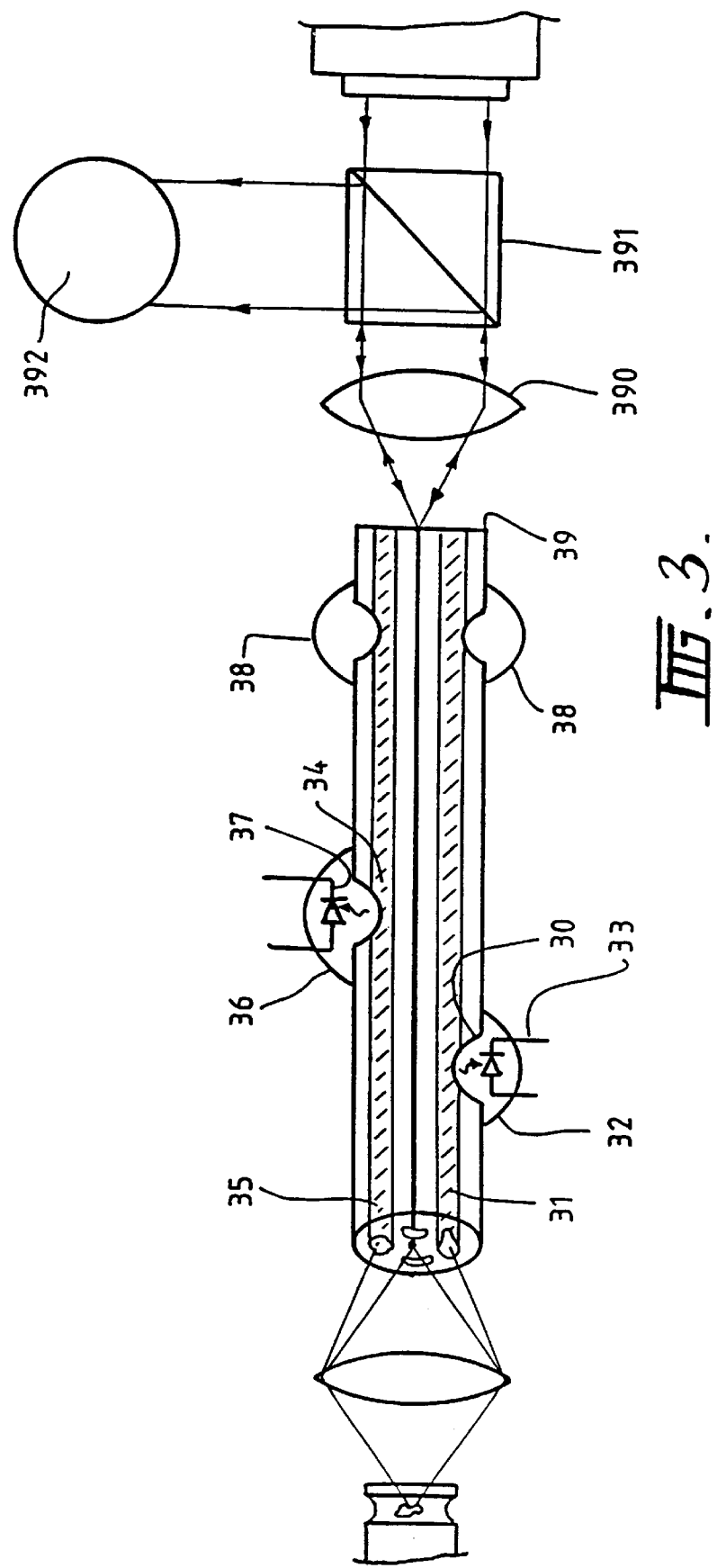
FIG. 3 is a diagram showing a schematic optical arrangement of a variation of the first embodiment using "four leaved clover" fibres (see 26) as the near confocal optical transmission means, and etched regions of fibre to provide the progressive selection.

Referring now to FIG. 3, there is shown a means of tapping the near confocal light in a progressive manner to provide the variable selection means of the first class, applicable to the four leaved clover fibre arrangement. An etched region 30 of the fibre exposes a channel 31 and is filled with optical cement 32 having a refractive index equal to or greater than that of silica. Within the optical cement 32 is embedded a photo detector 33 as a part of the detector means. Light travelling along channel 31 encounters the etched region 30 and is diverted into the optical cement, activating the photo detector 33. Similarly, a second etched region 34 is provided which exposes a section of a second one 35 of the four leaved clover channels, and is again filled with optical cement 36 containing a second photo detector 37. The variable selection means is provided by switching means, and hardware or software, to select light from the desired detectors. Further down the fibre, a launch mode stripper 38 is provided which exposes all but the central core and prevents laser light in the light beam from the laser from travelling down the four leaved clover cores and into the detectors 33 and 37.

At a remote end 39 of the fibre, light from the confocal core emerges and returns through light source focussing optics 390 and is partially deflected by a light separator in the form of beam splitter 391 into a photomultiplier tube 392 to provide detection of the confocal return light, in a similar manner to known laser scanning confocal microscopes.

The embodiment shown in FIG. 3 uses only one single mode fibre core for both transmission of the light beam from the laser to the object and for collection and transmission to the detector of the confocal light (emanating from the confocal plane). Scanning can be achieved, as is disclosed in U.S. Pat. No. 5,120,953, by a number of means, including vibration of the fibre tip, and/or conventional scanning mirrors between the fibre tip and the specimen. Similar embodiments can be envisaged, in accordance with the disclosures of U.S. Pat. No. 5,120,953, which involve a separate fibre for transmission of the light beam. All the descriptions given here including the embodiment of FIG. 3 correspond to embodiments in which the light is conveyed to the microscope head and specimen by means of a core of a single mode fibre. In these embodiments the alternative channels for conveying the near confocal light back to the photodetector are within the same fibre which conveys the light to the specimen. In accordance with the teachings of U.S. Pat. No. 5,120,953, a beamsplitter may be used and the fibre conveying the confocal light back to the photodetector may be a second completely separate fibre. All the methods described in the current specification can also be applied to the two fibre system in which the modal selection means are applied to the second return fibre to selectively extend or restrict the depth of field.

Figure 2D:
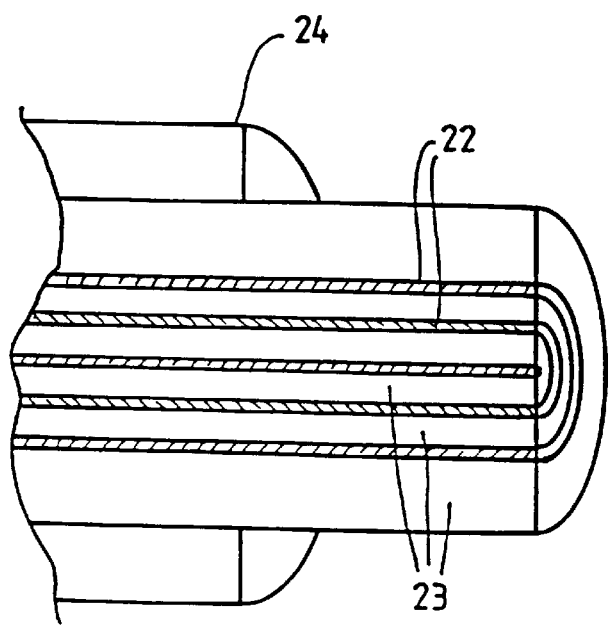
Figure 4:
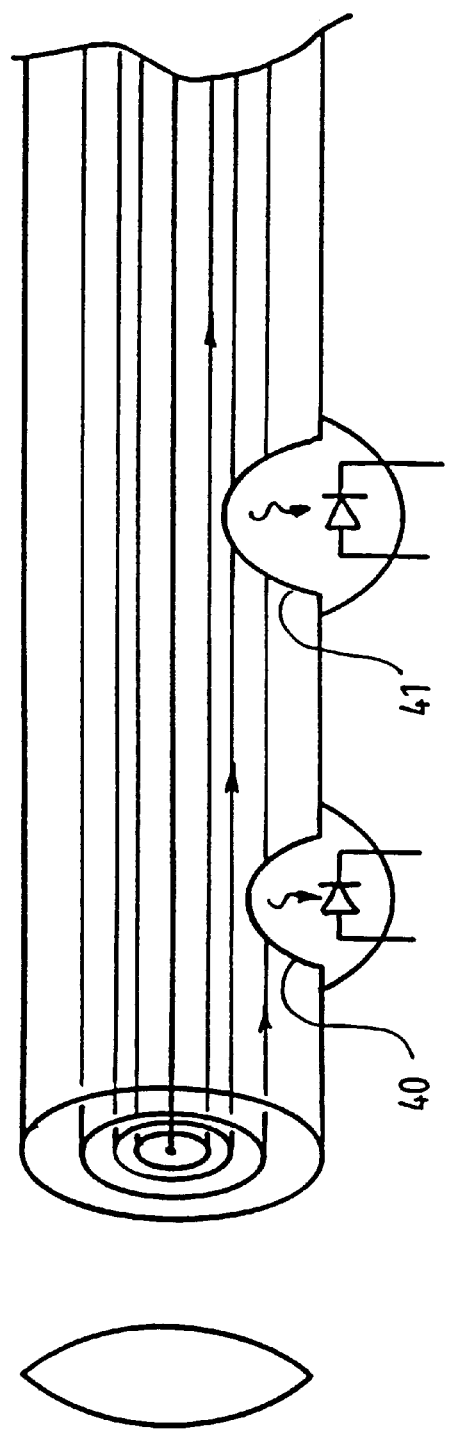
FIG. 4 is another variation of the first embodiment showing the use of a concentric wave guide structure.

Referring now to FIG. 4, there is shown a similar variable selection means for the concentric wave guide structure shown in FIG. 2d, with etched regions of progressively deeper extent being applied along an exit region of the fibre. The first region 40 extracts light only from the outermost core. The next region 41 is slightly deeper and it extracts light from the second outermost core, light from the outermost core already having been extracted. Further and deeper regions may be arranged in succession. A launch mode stripper (not shown) is provided at the end of the fibre, as in FIG. 3, and similar switching means are provided.

Figure 5:
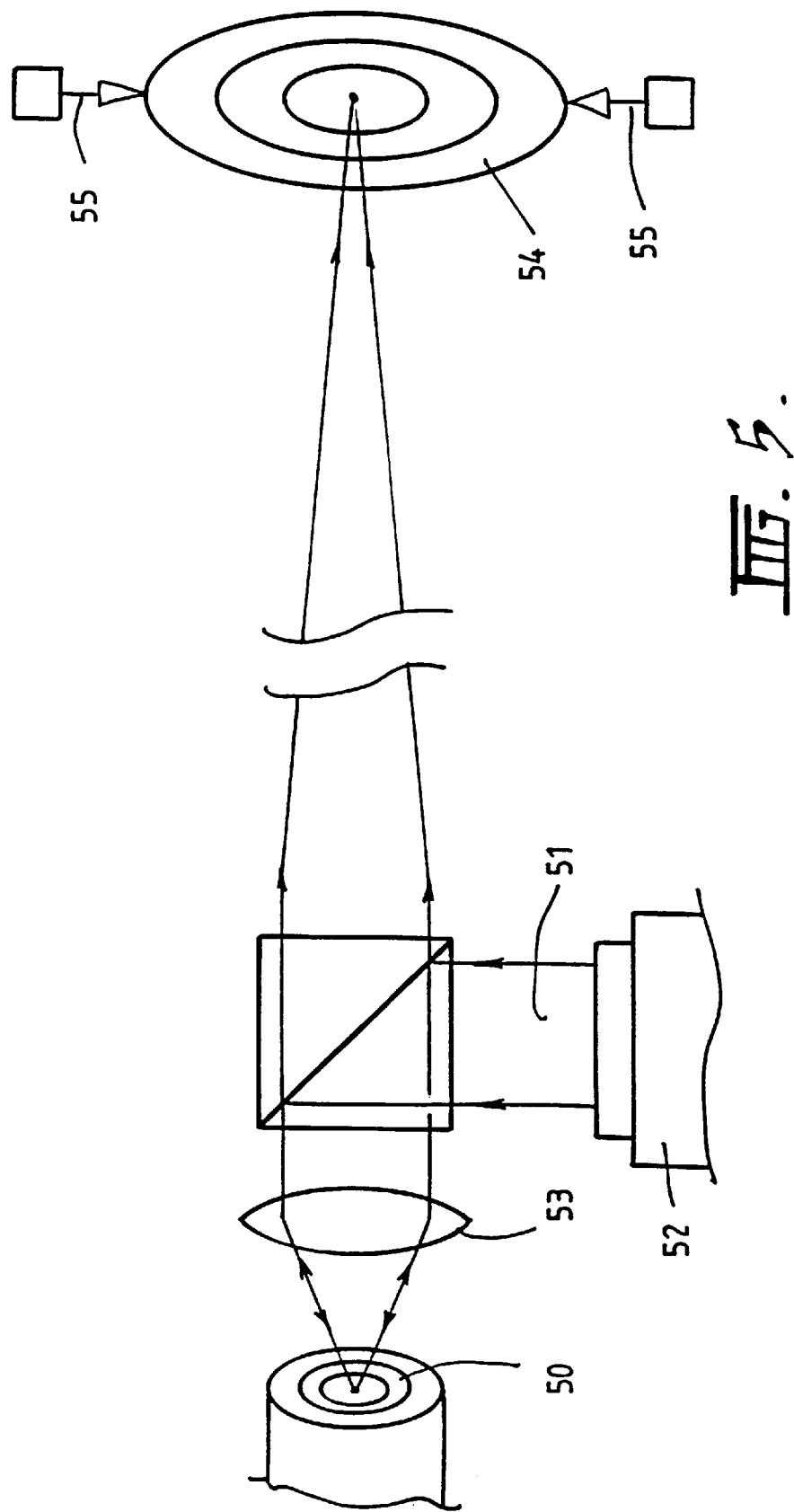
FIG. 5 is another variation of the first embodiment showing the progressive selection means provided by the projection of an image of an emission end of the fibre.

Referring now to FIG. 5, there is shown an alternative means of providing variable selection means in the first class of embodiments. The exit region is provided by an emission end 50, the same end which receives the light beam 51 from the laser 52. The laser focusing optics 53 also acts for the return light as a near confocal focussing means to provide an enlarged projected image of an emission end 50 of the fibre at a remote point 54. An iris diaphragm 55 is used to progressively exclude the selected portions of the light from entering the photomultiplier tube (not shown). This method is applicable to any of the isolated channel arrangements shown in FIG. 2. For isolated channel arrangements other than the concentric waveguide structure of FIG. 2(d), the preservation of XY information could also be used to advantage if a multiple photo detector is used. For example, if a quadrant photo detector is used in association with the four leaf clover design, a difference between the outputs of the four channels can be used in displaying other imaging modes such as differential interference contrast.

Figure 6:
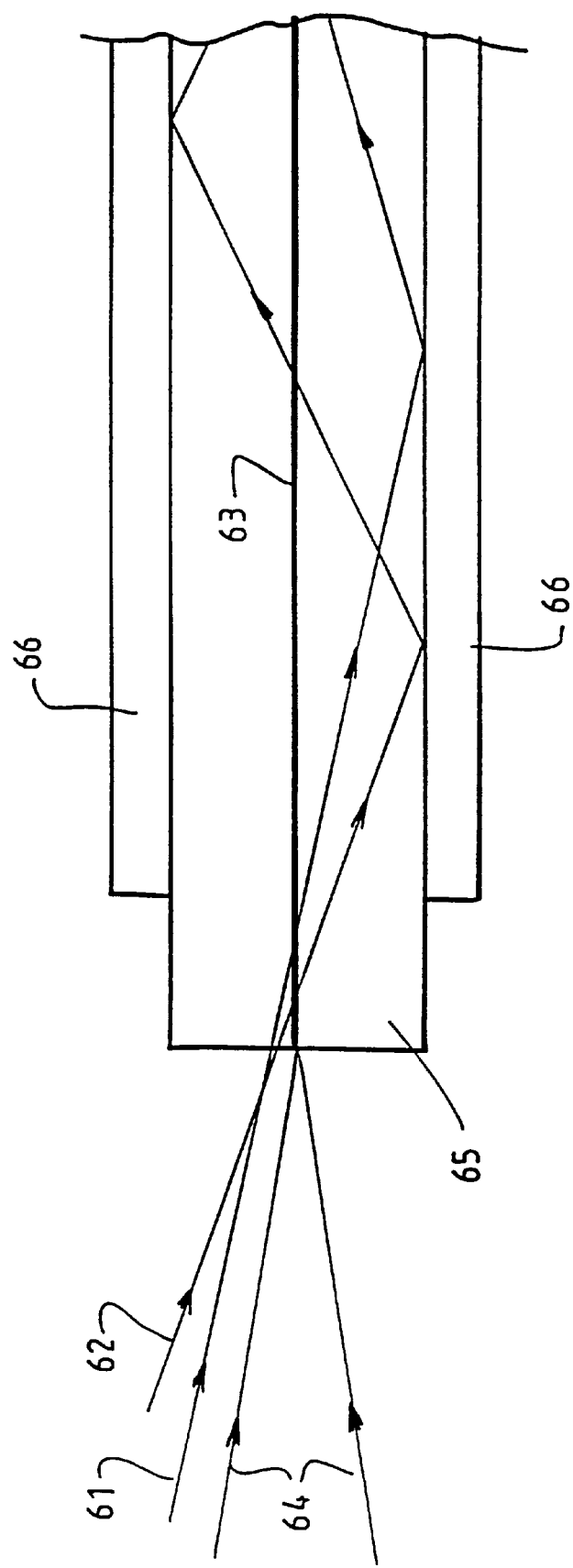
FIG. 6 is diagram showing the principle of transmission of light rays through the cladding of a single mode optical fibre.

Referring now to FIG. 6 there is shown near confocal light exemplified by rays 61 and 62 propagating as cladding modes through the cladding of a single mode fibre with core 63 accepting the confocal light 64. Single mode fibres are composed of a Ge doped core 63, typically of about 3 μm diameter, surrounded by silica cladding 65 of lower refractive index than the core, the diameter of the cladding typically being about 125 μm. Surrounding the cladding is a jacket. In such an arrangement, the cladding modes are accepted and propagate by total internal reflection if they are incident on the collection end 41 at an angle of less than about 30°. If it is desired to allow the cladding modes to propagate, the jacket should be constructed from a material of lower refracted index than the cladding. Transparent silicone rubber is a suitable material. Normally, the jacket is constructed from acrylic material which inhibits the propagation since cladding modes are normally undesirable.

In a microscope of conventional dimensions and using 125 micron fibre, the cladding 65 cannot be used on its own to transmit the near confocal light in a separable manner such that a selected portion of the near confocal light emerging from one or more selected distances within a range of distances above and below the focal plane may be separated from the remainder of the near confocal light. This is firstly because the light rays are mixed as they propagate through the cladding and emerge at the other end of the fibre in a disordered fashion, such that the ordered relationship between distance from the optical axis of entry and distance range from the focal plane is lost. Secondly, the angle of incidence of the near confocal light will not vary sufficiently when collected by 125 micron fibre in a manner dependent on depth of field.

Figure 7:
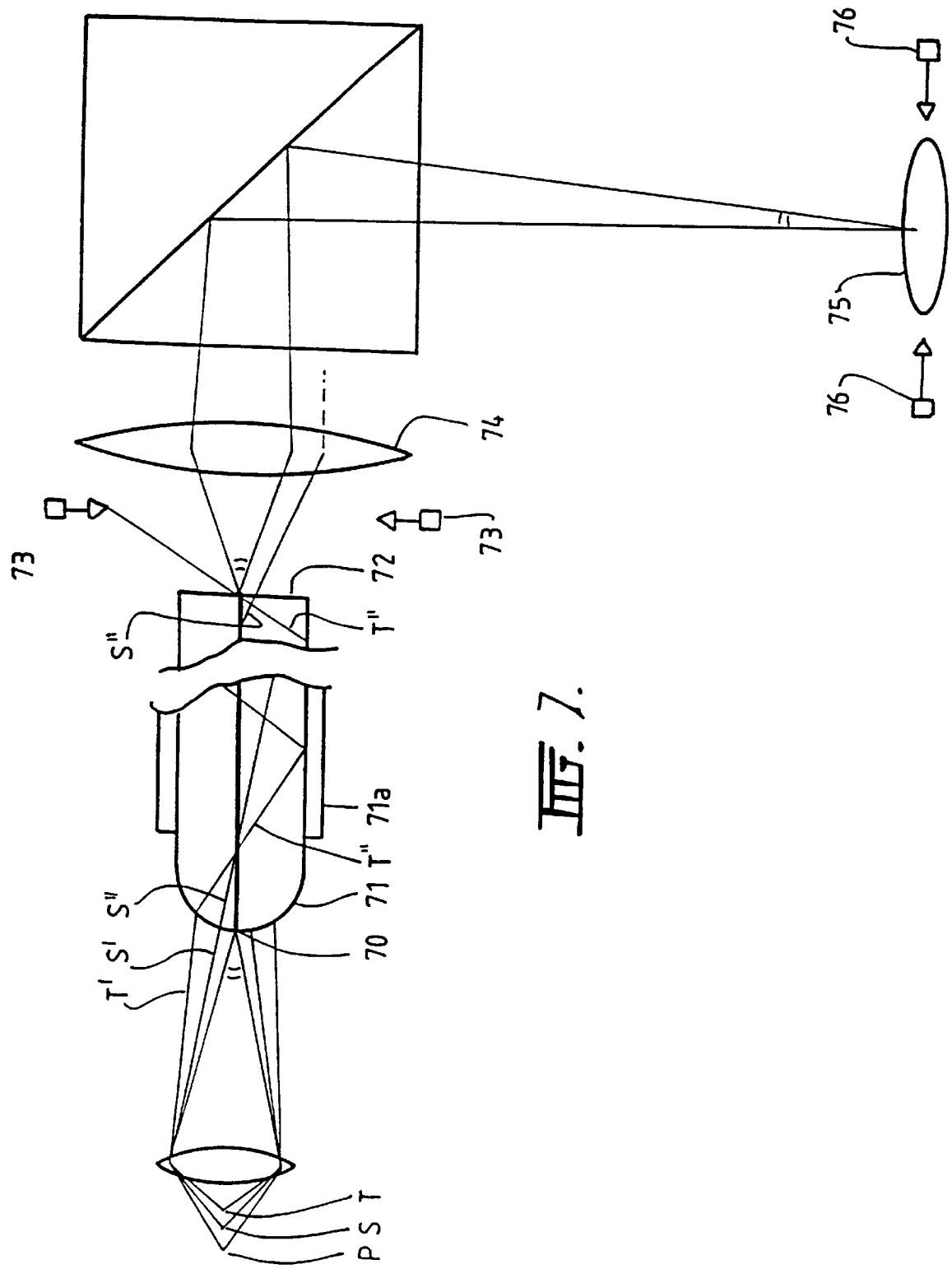
FIG. 7 shows one embodiment of the second class of embodiments where the near confocal optical transmission means is provided by the cladding of single mode optical fibre.

However, the fact that the angle of exit of the rays is always equal to the angle of entry can be used to advantage by the addition of optical element on or near the fibre tip. Referring now to FIG. 7, there is shown part of the optics of one of the second class of embodiments which uses the cladding modes by coding the distance from the axis into incidence angle of propagation within the cladding. Rays emerging from the confocal point P are shown entering the single mode core at 70 (exaggerated angle). The collection end 71 of the fibre is fashioned into a curved shape to provide a lensing effect which bends rays to a greater extent the more distant they enter from the optical axis. The confocal light effectively enters the core end 70 without refraction, since the curved shape is behind the core end 70. This shape may be manufactured by heating the end of the fibre so that softening and surface tension produces a curved shape. Light emerging from points S and T progressively farther from the focal plane enters along rays S' and T' progressively farther from the optical axis, and therefore corresponds to rays S" and T" of increasing angle of propagation. Jacket 71a is composed of a suitable low RI material such as silicone plastic. At an emission end 72 of the fibre, the distance from the axis at which the rays S" and T" emerge is not ordered in accordance with the angle of propagation, but the angle of emergence is so ordered. This can be used to advantage by provision of far-field iris diaphragm 73 in front of the near confocal focusing means 74, which also may act as the laser focussing optics. In a fully opened position the iris diaphragm admits substantially all of the light emerging from the emission end 72, which is then focused onto an image of the fibre tip at detection focal plane 75. A further near-field iris diaphragm 76 in front of the detection focal plane 75 will not operate in a progressive manner similar to iris diaphragm 73 since the spatial variation of intensity in a projected image of the fibre end is not correlated in this embodiment with distance from the axis of entering light, but may be used to exclude the near confocal light from entering the photo detector when operating at maximum resolution to detect only confocal light. When the far-field iris diaphragm 73 is partially opened, the near-field iris diaphragm 76 will vary the proportion of near confocal light being admitted.

It may be advantageous to provide a section near the tip of the fibre having reduced overall diameter (not shown) by hydrofluoric acid etching or other techniques so that the radius of curvature of the tip can be decreased to give a reduced path length for the required separation of the near confocal light. This section may be reduced in diameter in a single step or gradually as an adiabatic taper.

Figure 8:
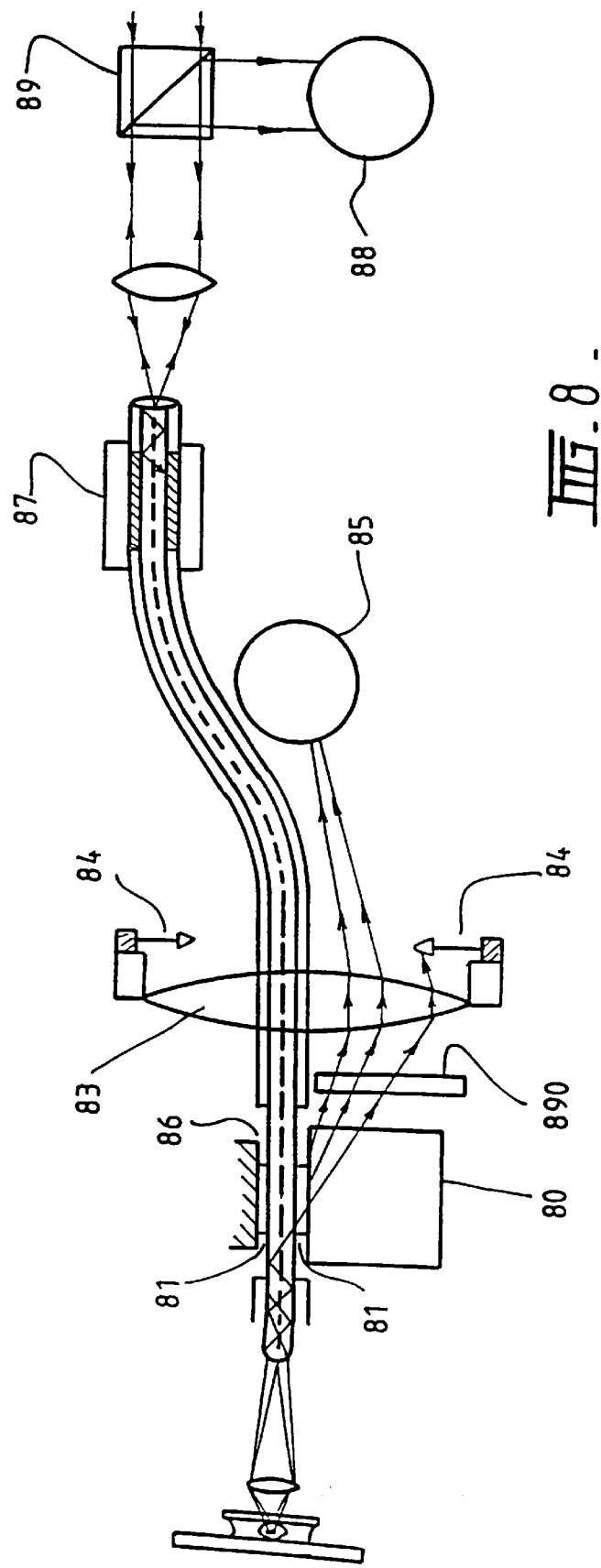
FIG. 8 shows a variation of the second class of embodiments using cladding modes of a single mode fibre where the near confocal light is extracted from the side of the fibre.

Referring now to FIG. 8, there is shown an alternative means of extracting the near confocal light from one of the second class of embodiments which uses cladding mode propagation. A glass block 80 is optically connected by optical glue 81 to an exposed part of the cladding of the fibre. The refractive index of the glass block must be higher than or equal to the refractive index of the optical glue which must be higher or equal to the refractive index of the fibre cladding. Lens 83 focuses the light emerging through variable iris 84 onto photomultiplier tube 85. A mirror 86 reflects light emerging from the other side of the fibre to follow substantially the same path. A cladding mode stripper 87 prevents laser light from the laser travelling along the cladding. The confocal return light travelling along the core of the fibre, which passes through the centre of lens 83 is extracted at the fibre end in a standard manner and passed via beamsplitter 89 to photo detector 88. In fluorescence imaging applications, where the wavelength of the object emanated light differs from the wavelength of the laser source light, a laser exclusion filter 890 can be used to exclude any stray laser source light which is reflected from the tip back into the fibre as cladding modes. Anti-reflection coatings or other tip treatments could be employed without filter 890 if the apparatus is to be used in reflection mode confocal microscopy.

Figure 8A:
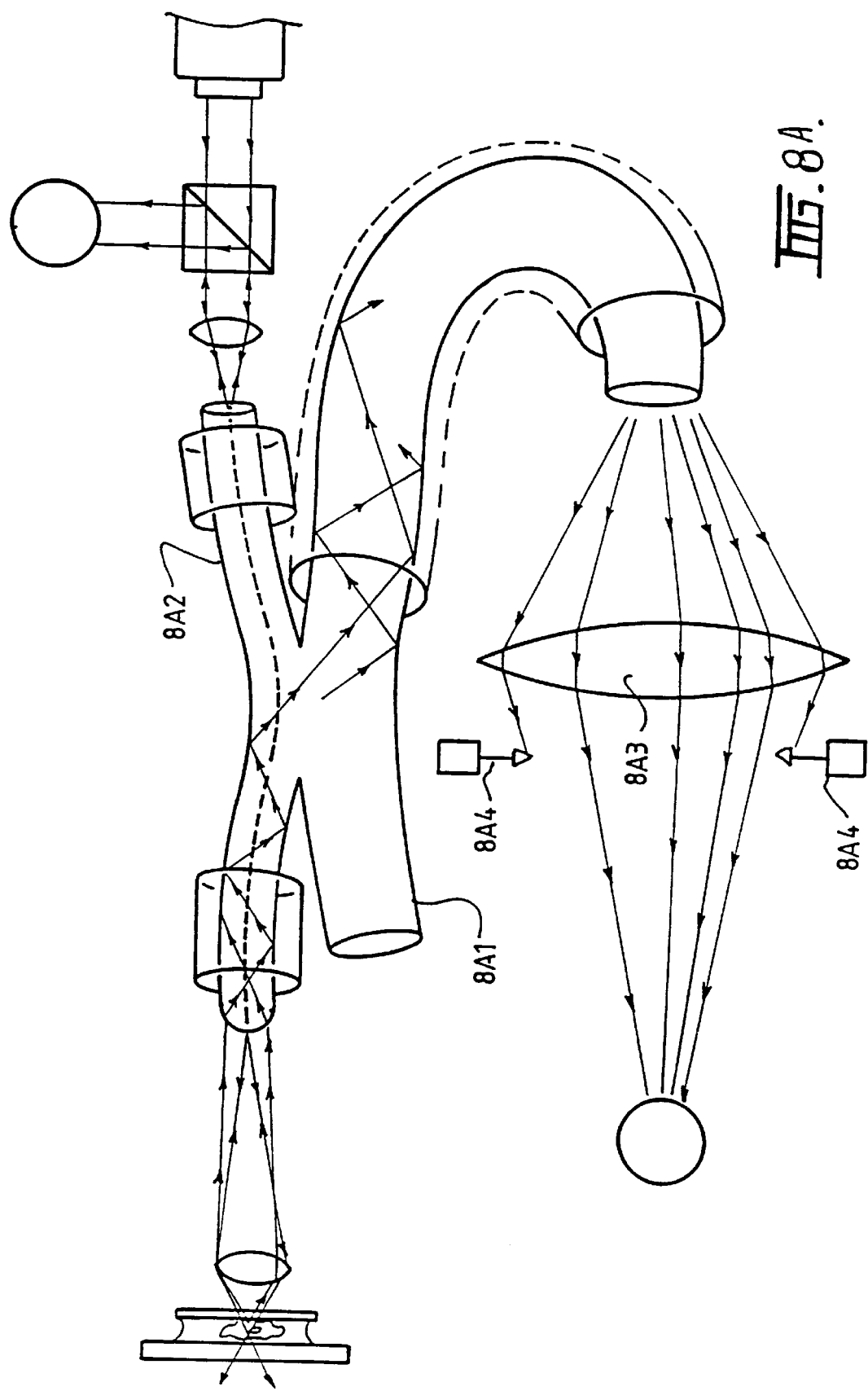
FIG. 8A shows a variation of the embodiment of FIG. 8, but with a second waveguide providing an alternative path for the near confocal light to be converged to the photodetector.

An alternative similar arrangement is shown in FIG. 8A, where a second glass fibre 8A1, preferably of larger diameter and the same or higher refractive index as the cladding of the first fibre 8A2 (corresponding to the fibre of FIG. 8), is fused to the first fibre 8A2 over a length of some millimeters. The light travelling down the cladding of first fibre 8A2 is channelled into the larger second fibre 8A1 in proportion to the cross-sectional areas of the two fibres, and the angular ordering of the light rays is maintained. If a 500 micrometer fibre is used for the second fibre 8A1, and a 125 micrometer fibre for first fibre 8A2, then approximately 94 percent of the cladding modes will be channelled into the second fibre 8A1. Lens 8A3 and iris diaphragm 8A4 may then be positioned remote from fibre 8A2, removing the need for encompassing the lens around fibre 8A2.

Figure 8B:
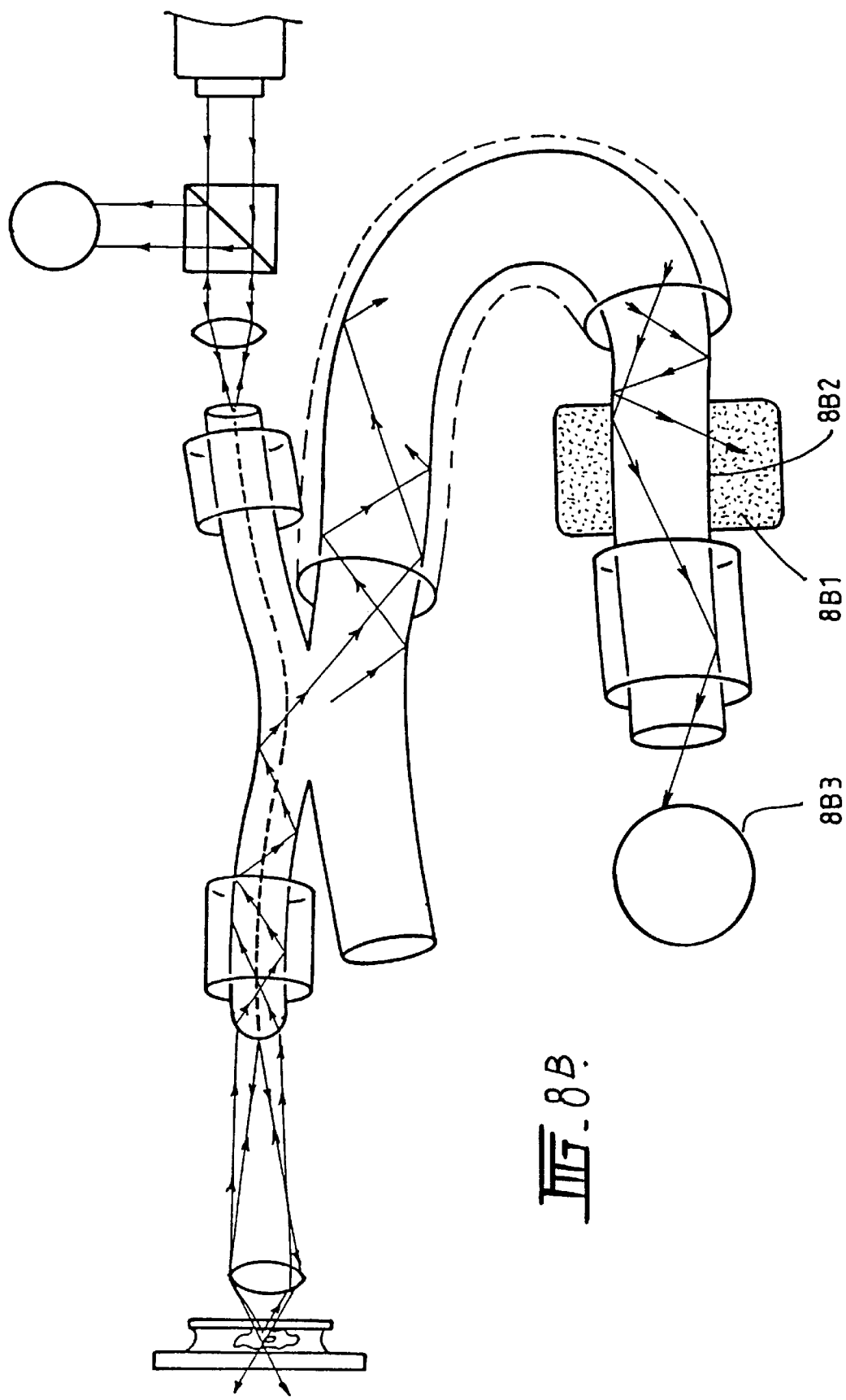
FIG. 8B shows a variation of the embodiment of FIG. 8A, but with the second fibre provided with a material of variable refractive index to provide the variable selection means.

FIG. 8B shows another alternative means of providing the variable selection means, where a material 8B1 of variable refractive index is contacted with an exposed part 8B2 of the cladding of the fibre (corresponding to the fibre of FIG. 8). A variable amount of higher order modes can then be extracted through surface 8B2 and discarded. The remaining complementary fraction passes to photomultiplier tube 8B3. The material of variable refractive index may be a collection of different liquids selectively being made to contact the surface 8B2, or a series of soft polymer blocks.

A further alternative similar arrangement is shown in FIG. 9 where a perspex box 90 surrounds the fibre, including a region containing exposed cladding at 92. Clear polyester resin 93 is poured into the box 90 and sets.

Figure 9A:
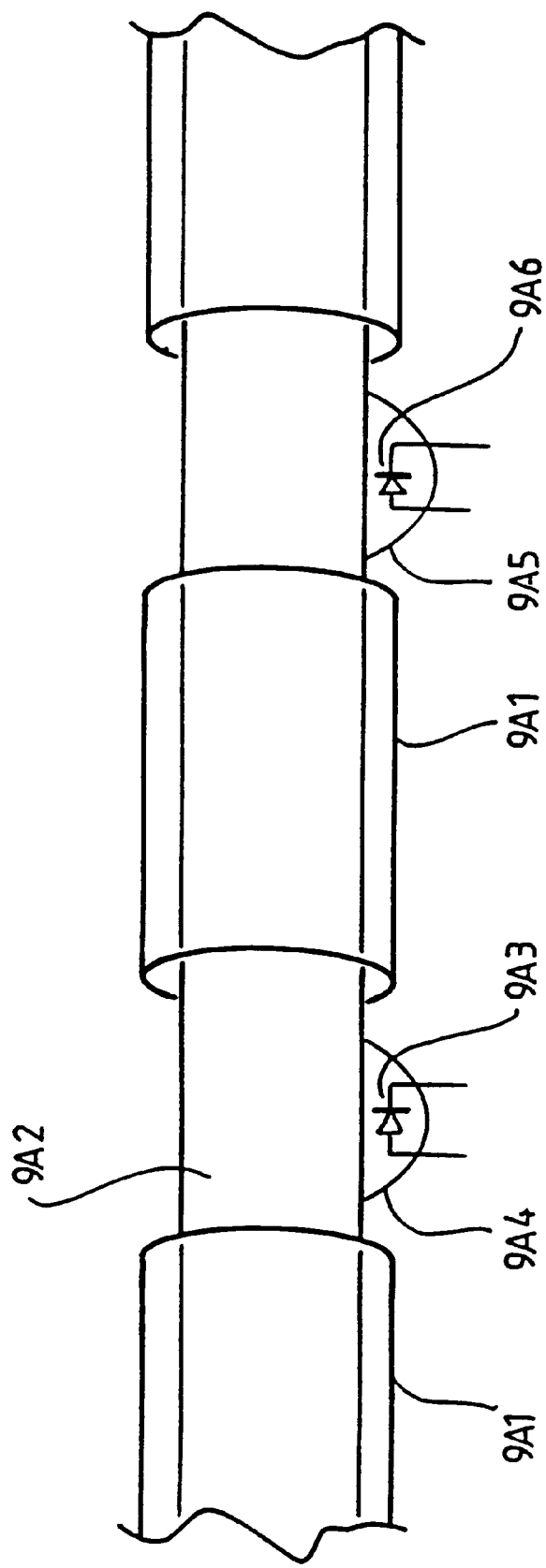
FIG. 9A shows a variation of the second class with the near confocal light extracted progressively.

Referring now to FIG. 9A, there is shown an alternative exit region for embodiments of the second class. Rather than have a single exit region as in the embodiments of FIGS. 8 and 9, whereby the selection means is provided by lenses and irises, it is possible to use successive regions of the fibre with the jacket 9A1 removed and drops of optical glue with successively increasing refractive index to cause rays of successively lower angle of internal propagation to be extracted. If the cladding 9A2 typically has a refractive index of 1.45 and the jacket 9A1 typically has a refractive index of 1.40, in a first stripped region a blob 9A4 of optical glue may have a refractive index of, for example, 1.41 to extract a first portion of high angle propagation rays into the glue in which is placed a photo detector 9A3. At a second region optical glue 9A5 having refractive index of 1.42 and detector 9A6 extracts further light greater than a lower angle, and so on. As in the embodiments shown in FIGS. 3 and 4, launch mode strippers are disposed at one end and switching means provide the variable selection means (not shown). The blobs 9A4 and 9A5 are not to scale and are typically 3 to 4 mm or more in size, sufficiently long in an axial direction of the fibre to extend at least as far as the internally reflecting ray path "pitch".

A conventional objective lens may be used in place of the curved fibre tip if the light is allowed to propagate on an extended path to allow sufficient lateral divergence of the near confocal light from the confocal light cone to thereby produce the required coding of lateral separation into angular separation. The advantage of the curved fibre end is that it allows for a much shorter distance between fibre tip and specimen. Any arrangement where the confocal channel is disposed such that the confocal light is not adversely refracted by the lens may be suitable to allow short distance separation between tip and specimen.

Figure 10A:
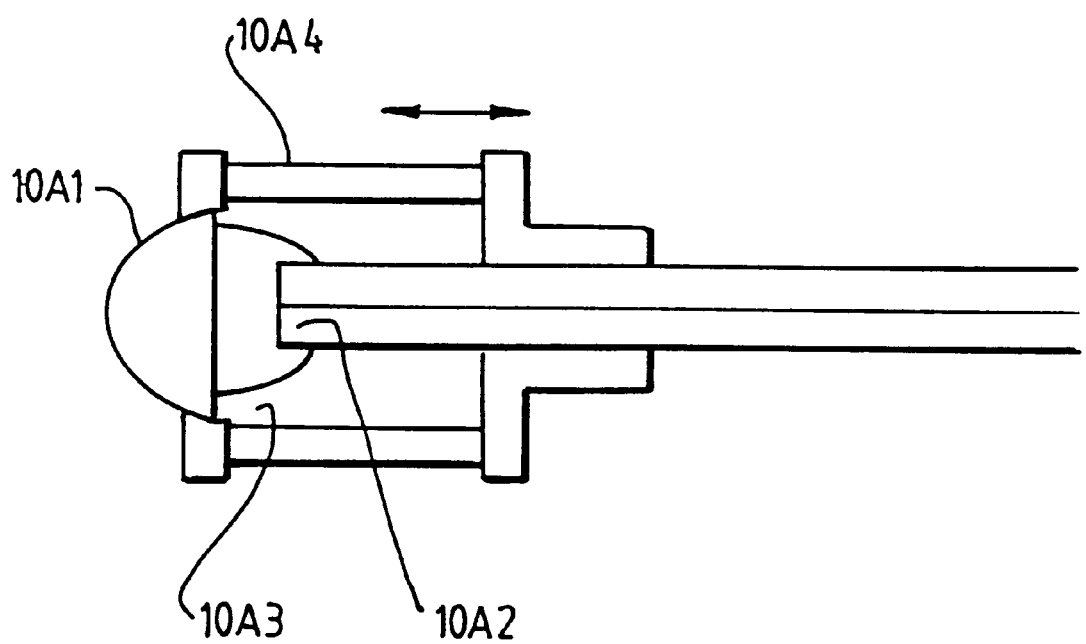
FIG. 10A shows a variation of the embodiment of FIG. 10.

The integral focusing provided by the curved end 71 in FIG. 7 may be provided by separate small lens glued onto the fibre such as a ball lens 100 shown in FIG. 10, typical ray paths 101 for which are shown. A disadvantage of this embodiment is that the confocal light and the laser emission light is also focussed by the ball lens, again requiring a larger distance between fibre tip and specimen. This embodiment also does not correct for chromatic aberration. However, one advantage is that relative movement between fibre tip and lens is made possible. In order to match the projected laser beam to a variety of lenses in the microscope turret, each having a different back focal diameter it is desirable to have an adjustment mechanism by means of which the fibre tip entering the head can be moved towards or away from the lens adjacent the fibre tip. FIG. 10A shows lens 10A1 attached by a flexible optical glue 10A3 to fibre tip 10A2 housed within a piezoelectric cylinder 10A4. The cylinder 10A4 is contractible in length, which shifts the fibre tip longitudinally by a few microns. This motion increases the width of the light beam with negligible alteration in the beam angle, and after passing through the transfer optics this adjustment can be used to match the aperture of the objective lens being used, maximising the optical efficiency and resolution for each lens.

Figure 11:
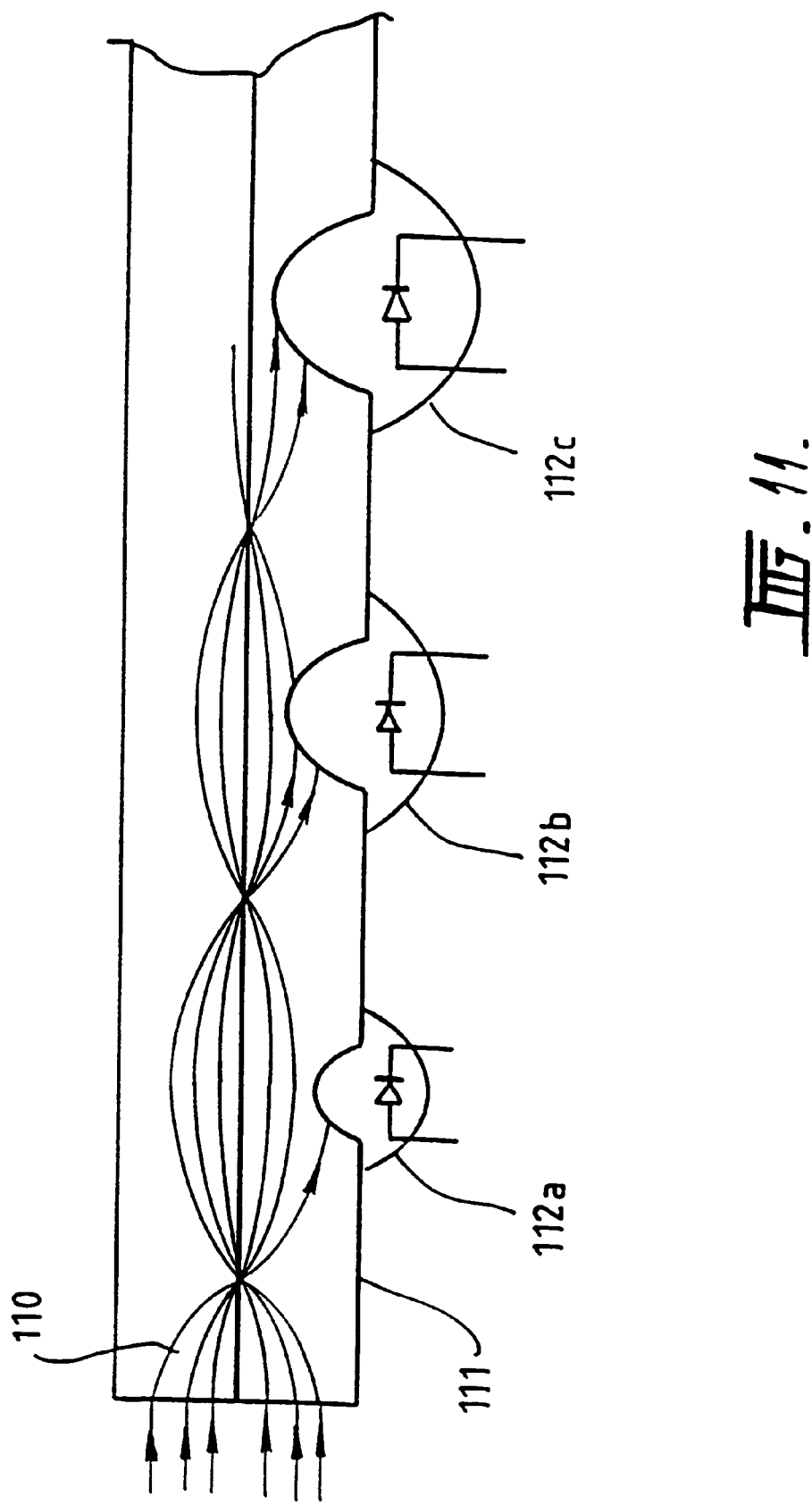
FIG. 11 shows an example of the third class embodiments using a gradient index fibre and etched sections of fibre for the selection means.
Figure 11A:
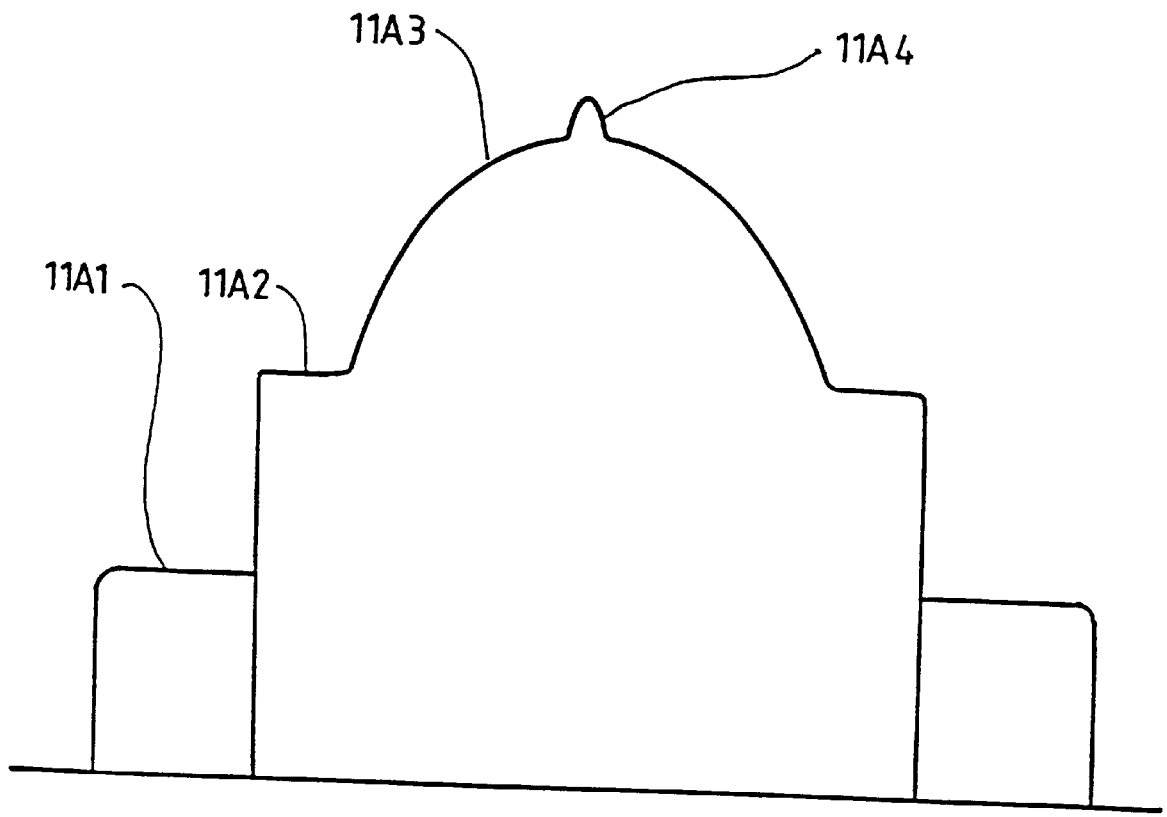
FIG. 11A shows the gradient index profile of the fibre of FIG. 11.

One of a third class of embodiments is shown in FIG. 11 where instead of a lens on or in front of the face of the fibre, a gradient index "mammary profile" fibre is used in place of a single mode fibre. In this fibre, the optical material surrounding the single mode core has gradations of refractive index, providing a curved ray paths 110 for the modes propagating in the fibre outside the core. FIG. 11A shows a refractive index profile for the "mammary profile" fibre. Regions 11A1 correspond to the polymer jacket, regions 11A2 to the glass cladding, region 11A3 to the multimode-supporting region of gradations of index and 11A4 to the single mode core region. The maximum angle of propagation of ray paths is related to the distance from the optical axis at which the ray path enters as a minimum distance of approach of the ray to the outer face 111. Thus, rays entering at a greater distance from the optical axis have greater maximum angle of propagation as they cross the optical axis and go closer to the outer face 111.

Thus progressive selection of the near confocal light by means of a series of progressively deeper etched regions with optical glue at 112a, 112b and 112c is possible. The diagram in FIG. 11 of ray paths is schematic only. The rays in fact do not enter the fibre in a manner which would cause the maintenance of node regions more than a short distance along the fibre. Each etched region is in fact not placed strategically with respect to a node, but is elongate along the fibre axis for about 3 to 4 mm, being several times the pitch length of the oscillatory ray path, whereby a single etched region on one side of the fibre to a depth $\Delta$ will absorb effectively all light rays which come within $\Delta$ of the surface at their maximum of oscillation.

Figure 12:
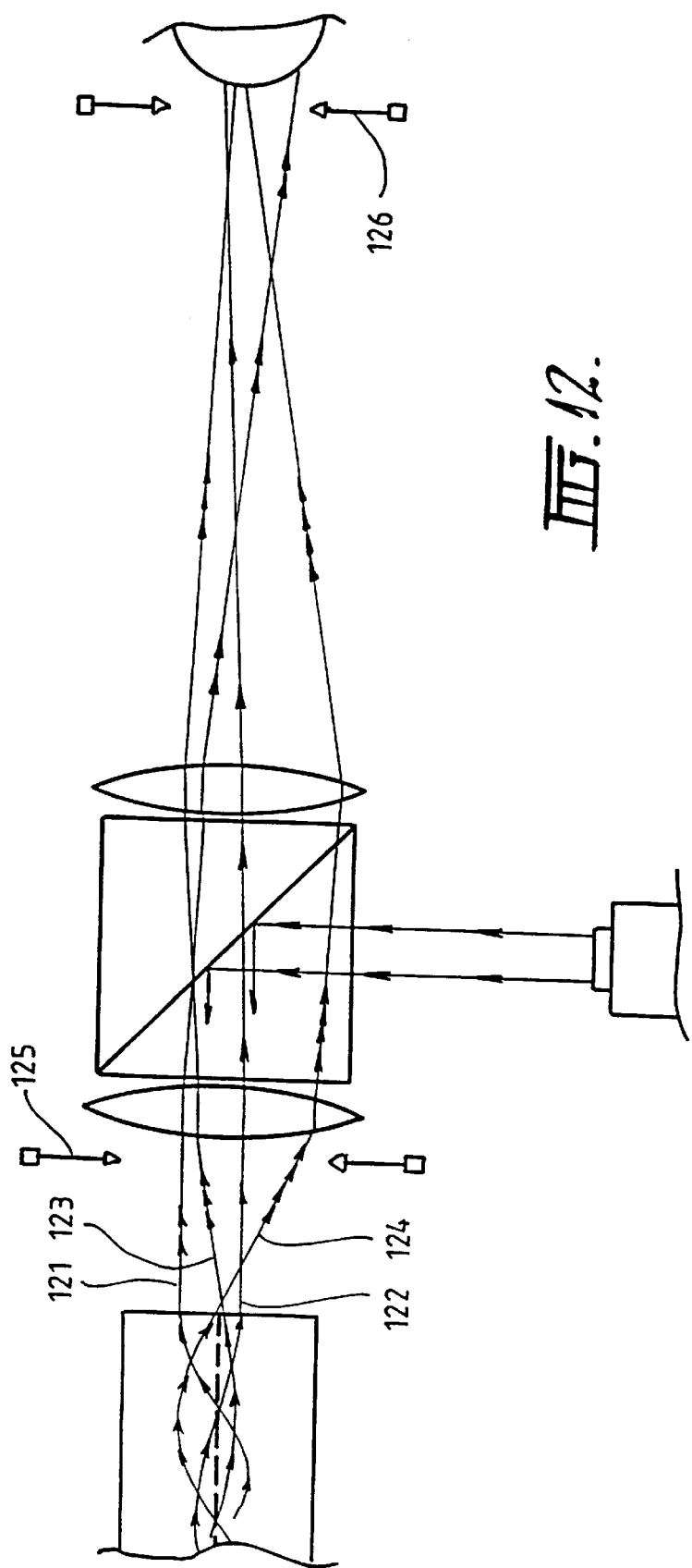
FIG. 12 is a diagram showing an emission end of a gradient index fibre and selection means in embodiments of the third class which make use of the projected image of a fibre tip.

Referring now to FIG. 12, there is shown the emission end 120 of a gradient index fibre according to another variation of the third class. A double iris diaphragm arrangement similar to that shown in FIG. 7 is employed here, although the principle of operation is somewhat different. The light emerging from the remote end of the fibre is either far from the axis and has a low angle of incidence such as rays 121 and 122, or is near to the axis and has a high angle of incidence such as rays 123 and 124. The light which proceeds to iris diaphragm 126 is light which is emerging from the fibre at a low angle, aperture 125 blocking out high angle light. This light is approximately ordered in distance from the core in a corresponding manner to the light entering the fibre, in turn corresponding to distance from the focal plane in the specimen. For example, ray 121 is shown emerging slightly further from the core than ray 122, and is excluded from detection by the variable iris diaphragm 126, while ray 122 is accepted. The situation is more complex than this in practice, because the idealisation of nodes depicted in FIG. 11 is not realised. This results in there being also rays ordered in angle rather than distance form the core, and these may be progressively selected by operation of iris diaphragm 125. In practice, there is a continuous range of intermediate cases also. The entire range can however be progressively selected to an acceptable degree by operating iris diaphragm 125 and 126 simultaneously. The projected image of the fibre tip at iris diaphragm 126 is then displacement-coded from the axis in the desired manner, and its operation of the iris diaphragm 126 is such as to produce a variable pinhole effect for the near field modal pattern rays. Operated in conjunction with variable occlusion of the for field modal pattern rays by iris diaphragm 125 this will provide operation which is functionally equivalent to a conventional variable physical pinhole in a confocal microscope system.

Still another arrangement in shown in FIG. 13 where a first fibre 131 is shown cast into a polymer block 132, the surface 133 having been polished away to expose the cladding almost to the core 134. A variable amount of the higher order modes can then be extracted through surface 133 and discarded by sliding a second polymer block 135 progressively over the surface 133, as is known analogously in variable ratio fibre coupler technology.

In order to achieve appropriate separation of confocal and near confocal light, it may be necessary in many embodiments of the invention to use beam extenders in order to provide an adequate distance between the fibre tip and the objective while maintaining manageable product dimensions. This can be designed in a compact package using standard opposing mirror techniques as is well known in the art.

The principle of coupling out modes from a fibre by means of a surrounding medium, the refractive index of which can be changed, might also be applied to the light form the laser on the way to the microscope head. If a few moded communications fibre was used as the optical transmission means and the cladding glass was etched away from a section of this fibre and replaced with a controllable variable RI material then the modes passing into the microscope could be controlled at the same time as the modes coming back to the detectors. This would have certain advantages in giving extra signal strength for low fluorophore concentrations where there is fluorescence saturation and where non linear bleaching may be a problem.

Modifications may be made to the invention as would be apparent to a person skilled in the art of confocal optical design. For instance, the invention is not restricted to applications requiring a diffraction-limited confocal spot and imaging systems other than microscopes which can make use of the same optical principles are within its scope. Further still, the near-field iris diaphragms which are disposed adjacent a projected image of the fibre end and its associated photo detector may be replaced by CCD arrays if desired and the selective exclusion of light performed in software. CCD arrays may similarly be used with far-field pattern decoding.

Also, a number of embodiments have been shown which variously use exit regions in either a mid region of the near confocal return fibre or an end; selection means which may be classified as "near field" or "far field", being composed of lenses and irises or switching means; and "coding" systems in three classes using isolated channels or angular coding. Other combinations of these basic ideas may be envisaged and are also within the scope of the invention.

Further, as explained above the single-fibre embodiment shown here can be replaced by dual fibre systems, with source fibre and return fibres being separate or also with the confocal return being provided by a separate fibre to the near-confocal return. These and other modifications may be made without departing from the ambit of the invention, the nature of which is to be ascertained from the foregoing description and the drawings.

We claim:

1. A confocal imaging system comprising:
    a light source for supply of a light beam;
    light focusing means for focusing light from the beam onto a point observational field on or within an object and for receiving object emanated light emanating from the vicinity of the point observational field;
    a detector for detecting the object emanated light;
    scanning means operable to cause relative movement between the object and the point observational field such that the point observational field scans over a focal plane transverse to an optical axis of the imaging system; and
    flexible optical transmission means for transmitting the source light beam from the light source to the light focusing means and for transmitting the object emanated light to the detector, and having light separator means to separate the object emanated light from the light beam for passing to the detector and confocal optical transmission means to transmit the object emanated light emerging only from the point observational field;
    wherein the optical transmission means further comprises
        (i) flexible near confocal optical transmission means having a light collection end adjacent to a light collection end of the confocal optical transmission means and adapted to transmit only near confocal light emerging from points in the object located within a range of distances above and below the focal plane in such a manner that a selected portion of the near confocal light emerging from greater than a corresponding selected distance within said range is substantially separable from the remainder;
        (ii) an exit region for exit of at least a portion of said near confocal light from the flexible near confocal optical transmission means;
        and wherein there is further provided variable selection means to define said selected portion and exclude it from the detector.

2. A confocal imaging system as claimed in claim 1 wherein the near confocal optical transmission means comprises a wide diameter fibre or the cladding of a single mode optical fibre.

3. A confocal imaging system as claimed in claim 2 wherein the focussing means causes rays entering the light collection end of the optical fibre to be transmitted through the fibre at an angle which increases with the distance of a point of entry of the ray into the collection end from the optical axis of the fibre such that the substantial separability of said selected portions is thereby attained.

4. A confocal imaging system as claimed in claim 3 wherein the focussing means comprises a ball lens glued onto the collection end of the optical fibre.

5. A confocal imaging system as claimed in claim 3 wherein the focussing means comprises the collection end of the fibre fashioned into a curved shape to provide a lensing effect which bends rays to a greater extent the more distant they enter from the optical axis.

6. A confocal imaging system as claimed in claim 5 wherein there is provided a narrow section near the tip of the fibre having reduced overall diameter such that the radius of curvature of the tip is decreased to give a reduced path length for the required separation of the near confocal light.

7. A confocal imaging system as claimed in claim 6 wherein the narrow section is reduced in diameter in a single step.

8. A confocal imaging system as claimed in claim 6 wherein the narrow section is reduced in diameter adiabatically.

9. A confocal imaging system as claimed in claim 3 wherein the variable selection means includes a variable diaphragm disposed adjacent the exit region to exclude light emerging at greater than a selected angle.

10. A confocal imaging system as claimed in claim 2 wherein the exit region is provided by an emission end of the fibre.

11. A confocal imaging system as claimed in claim 10 wherein the variable selection means includes near confocal focussing means to focus an image of the emission end of the fibre onto a second variable diaphragm.

12. A confocal imaging system as claimed in claim 3 wherein the exit region is provided by one or more regions where the side of the fibre is exposed and contacts an extracting material with refractive index suitably matched to the fibre so as to extract some or all of the near confocal light.

13. A confocal imaging system as claimed in claim 12 wherein the exit region is provided by a single such exposed region.

14. A confocal imaging system as claimed in claim 13 wherein the extracting material is a glass block optically connected to the exposed region.

15. A confocal imaging system as claimed in claim 13 wherein a clear box surrounds the fibre, including the exposed region and the extracting material is a clear resin set inside the box to optically connect with the exposed region.

16. A confocal imaging system as claimed in claim 13 wherein the variable selection means includes a variable diaphragm disposed adjacent the exit region of the optical fibre to exclude light emerging at greater than a selected angle.

17. A confocal imaging system as claimed in claim 12 wherein the exit region is provided by a plurality of said exposed regions arranged along the fibre contacting materials having progressively greater refractive index to progressively extract rays of lower angle, the variable selection means comprising optical or electronic switching means.

18. A confocal imaging system as claimed in claim 2 wherein the near confocal optical transmission means comprises a gradient index fibre.

19. A confocal imaging system as claimed in claim 18 wherein the exit region is provided by successively deepening etched areas in the fibre side with corresponding photo detectors.

20. A confocal imaging system as claimed in claim 18 wherein the exit region is provided by an emission end of the fibre.

21. A confocal imaging system as claimed in claim 20 wherein a first variable diaphragm is provided to admit only low angle light through near confocal focussing means to project an image of the fibre tip onto a second variable diaphragm in front of the detector.

22. A confocal imaging system as claimed in claim 1 wherein the near confocal optical transmission means comprises a plurality of optically isolated channels having adjacent ends at said light collection end to provide said substantially separable transmission.

23. A confocal imaging system as claimed in claim 22 wherein the plurality of channels is provided by a bundle of optical fibres.

24. A confocal imaging system as claimed in claim 22 wherein the plurality of channels is provided by a large diameter optical fibres with a plurality of cores.

25. A confocal imaging system as claimed in claim 24 wherein the plurality of channels is a plurality of coaxial concentric waveguides, mutually separated by optically insulating material.

26. A confocal imaging system as claimed in claim 22 wherein the exit region of the near confocal optical transmission means is provided by a plurality of etched sections of fibre exposing different ones or subsets of said plurality of channels and containing optical cement to divert light travelling in the corresponding one or subset of channels to corresponding photodetectors.

27. A confocal imaging system as claimed in claim 26 wherein the variable selection means comprises switching means to select output from different ones or subsets of said photodetectors.

28. A confocal imaging system as claimed in claim 22 wherein the exit region is provided by opposite ends of the plurality of isolated channels forming an emission end of the fibre or fibre bundle.

29. A confocal imaging system as claimed in claim 28 wherein the variable selection means comprises focusing means to project an image of the emission end onto a region containing a variable diaphragm to progressively exclude from detection said selected portion, the detector being disposed behind the diaphragm.

30. A confocal imaging system as claimed in claim 1 wherein the confocal optical transmission means is integral with the near confocal transmission means.

31. A confocal imaging system as claimed in claim 30 wherein the confocal optical transmission means comprises a single mode core disposed inside the near confocal optical transmission means.

32. A confocal imaging system as claimed in claim 1 wherein the confocal optical transmission means is separate from the near confocal optical transmission means.

* * * * *